US011347476B2

(12) United States Patent
Luo et al.

(10) Patent No.: US 11,347,476 B2
(45) Date of Patent: May 31, 2022

(54) DIGITAL FILTERING USING COMBINED APPROXIMATE SUMMATION OF PARTIAL PRODUCTS

(71) Applicant: Credo Technology Group Limited, Grand Cayman (KY)

(72) Inventors: Tianchen Luo, Milpitas, CA (US); Junqing Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 17/067,056

(22) Filed: Oct. 9, 2020

(65) Prior Publication Data

US 2022/0113939 A1   Apr. 14, 2022

(51) Int. Cl.
*G06F 7/523* (2006.01)
*G06F 7/50* (2006.01)

(52) U.S. Cl.
CPC ............... *G06F 7/523* (2013.01); *G06F 7/50* (2013.01)

(58) Field of Classification Search
CPC ............ G06F 7/501; G06F 7/505; G06F 7/5275–5277; G06F 7/5312–5324;
(Continued)

(56) References Cited

U.S. PATENT DOCUMENTS 5,903,470 A   5/1999 Miyoshi et al.
7,546,331 B2 *  6/2009 Islam .................. G06F 7/5312
                                                708/627

(Continued)

FOREIGN PATENT DOCUMENTS

WO   2019233558 A1   12/2019

OTHER PUBLICATIONS

T. Yang, T. Ukezono and T. Sato, "Design of a Low-power and Smallarea Approximate Multiplier using First the Approximate and then the Accurate Compression Method", 30 th ACM Great Lakes Symposium on VLSI , 2019 (Year: 2019).*

(Continued)

*Primary Examiner* — Matthew D Sandifer
(74) *Attorney, Agent, or Firm* — Ramey LLP; Daniel J. Krueger

(57) ABSTRACT

Digital filters and filtering methods may employ truncation, internal rounding, and/or approximation in a summation circuit that combines multiple sets of bit products arranged by bit weight. One illustrative digital filter includes: a summation circuit coupled to multiple partial product circuits. Each partial product circuit is configured to combine bits of a filter coefficient with bits of a corresponding signal sample to produce a set of partial products. The summation circuit produces a filter output using a carry-save adder ("CSA") tree that combines the partial products from the multiple partial product circuits into bits for two addends. The CSA tree has multiple lanes of adders, each lane being associated with a corresponding bit weight. The adders in one or more of the lanes associated with least significant bits of the filter output are approximate adders that trade accuracy for simpler implementation. In an illustrative receiver, the filter is coupled to a decision element that derives a sequence of symbol decisions.

19 Claims, 8 Drawing Sheets

(58) Field of Classification Search
CPC .......... H03H 17/0027; H03H 17/0225; H03H 2017/0081; H03H 2218/10
See application file for complete search history.

(56) References Cited

U.S. PATENT DOCUMENTS

2014/0379773 A1    12/2014    Rubanovich et al.
2018/0226953 A1*    8/2018    Kang ................... H03H 17/06

OTHER PUBLICATIONS

D. Esposito, A. G. M. Strollo and M. Alioto, "Low-power approximate MAC unit", 13th Conference on Ph.D. Research in Microelectronics and Electronics, 2017 (Year: 2017).*

D. Esposito, D. De Caro, E. Napoli, N. Petra and A. G. M. Strollo, "On the use of approximate adders in carry-save multiplier-accumulators", IEEE International Symposium on Circuits and Systems, 2017 (Year: 2017).*

Z. Yang, J. Han and F. Lombardi, "Approximate compressors for error-resilient multiplier design," 2015 IEEE International Symposium on Defect and Fault Tolerance in VLSI and Nanotechnology Systems (DFTS), 2015, pp. 183-186 (Year: 2015).*

Momeni, A., Montuschi, P., Han, J., & Lombardi, F. (Apr. 2015). IEEE Transactions on Computers. "Design and Analysis of Approximate Compressors for Multiplication", 64(4).

Kale, S. D., Prof., & Zade, G. N. (Oct. 2015). "Design of Baugh-wooley Multiplier using Verilog HDL". IOSR Journal of Engineering (IOSRJEN), 2(10), 2250-3021, 25-29.

Suganthi Venkatachalam and Seok-Bum Ko. (2017)IEEE Transactions on Very Large Scale Integration (VLSI) Systems. "Design of Power and Area Efficient Approximate Multipliers". 1063-8210, p. 1-2.

Sahithi, M., Shaik, N., Jhansi Rani, A., Poornima, J., Jyothi, M. & Purnima, K. (2012) IJSIT International Journal of Computer Science and Information Technologies. "Highly Accelerated Advanced Multiplier Design for an Efficient Bandwidth Utilized FFT Computation". 3 (1), 2957-2963.

Neau, C., Muhammad, K., & Roy, K. "Low Complexity FIR Filters Using Factorization of Perturbed Coefficients" (2001), 1530-1591, p. 268-272.

Gupta, V., Mohapatra, D., Raghunathan, A., & Roy, K. (Jan. 2013), IEEE Transactions of Computer-Aided Design of Integrated Circuits and Systems. "Low-Power Digital Signal Processing Using Approximate Adders". 32(1), 124-137.

Liang, J., Han, J., & Lombardi, F. (2012), IEEE Transactions on Computers. "New Metrics for the Reliability of Approximate and Probabilistic Adders". 2011-12-0946, 0018-9340.

Baugh, C.; & Wooley, B. (Dec. 1973), IEEE Transactions on Computers."A Two's Complement Parallel Array Multiplication Algorithm". C-22(12).

Keote, R.S. & Karule, P.T. (May-Jun. 2018), IOSR Journal of VLSI and Signal Processing (IOSR-JVSP). "Performance Analysis of Fixed Width Multiplier using Baugh Wooley Algorithum" 8(3-1), 2319-4200, 4319-4197, pp. 31-38.

Wallace, C.S. (February), IEEE Transactions on Electronic Computers. "A Suggestion for a Fast Multiplier", p. 14-17.

* cited by examiner

Fig. 6A
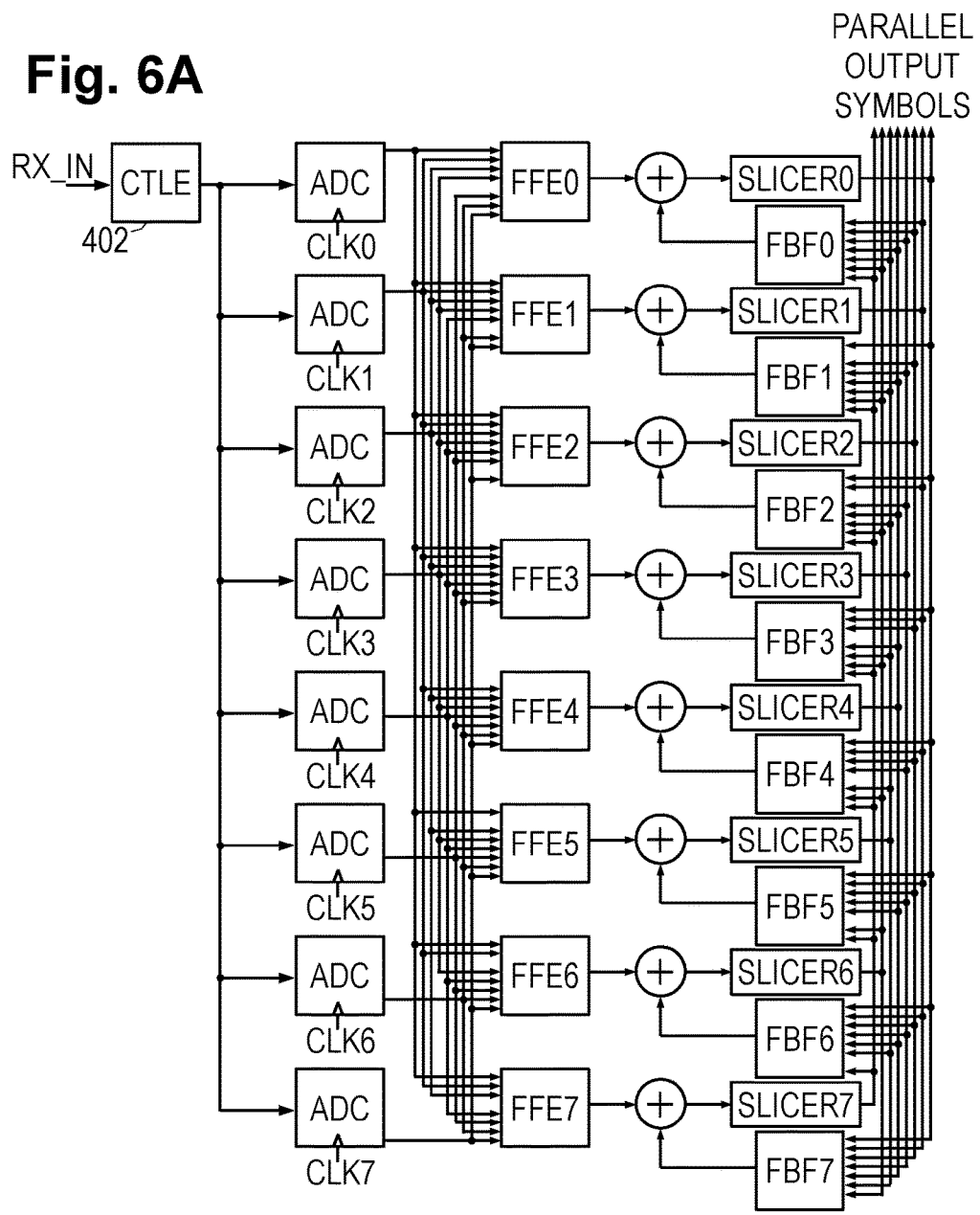
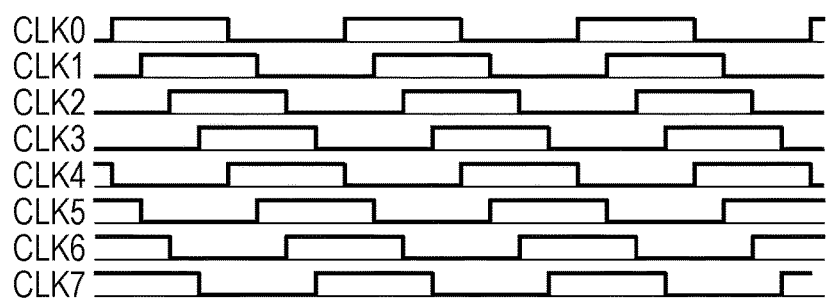
Fig. 6B

DIGITAL FILTERING USING COMBINED APPROXIMATE SUMMATION OF PARTIAL PRODUCTS

BACKGROUND

Digital communications occur between sending and receiving devices over an intermediate communications medium, or "channel" (e.g., a fiber optic cable or insulated copper wires). Each sending device typically transmits symbols at a fixed symbol rate, while each receiving device detects a (potentially corrupted) sequence of symbols and attempts to reconstruct the transmitted data. A "symbol" is a state or significant condition of the channel that persists for a fixed period of time, called a "symbol interval". A symbol may be, for example, an electrical voltage or current level, an optical power level, a phase value, or a particular frequency or wavelength. A change from one channel state to another is called a symbol transition. Each symbol may represent (i.e., encode) one or more binary bits of the data. Alternatively, the data may be represented by symbol transitions, or by a sequence of two or more symbols.

Many digital communication links use only one bit per symbol; a binary '0' is represented by one symbol (e.g., an electrical voltage or current signal within a first range), and a binary '1' by another symbol (e.g., an electrical voltage or current signal within a second range), but higher-order signal constellations are known and frequently used. In 4-level pulse amplitude modulation ("PAM4"), each symbol interval may carry any one of four symbols, denoted as −3, −1, +1, and +3. Two binary bits can thus be represented by each symbol.

Channel non-idealities produce dispersion which may cause each symbol to perturb its neighboring symbols, a consequence termed "inter-symbol interference" ("ISI"). ISI can make it difficult for the receiving device to determine which symbols were sent in each interval, particularly when such ISI is combined with additive noise.

To combat noise and ISI, both transmitting and receiving devices may employ various equalization techniques. Linear equalizers generally have to balance between reducing ISI and avoiding noise amplification. Decision Feedback Equalizers ("DFE") are often preferred for their ability to combat ISI without inherently amplifying the noise. As the name suggests, a DFE employs a feedback path to remove ISI effects derived from previously-decided symbols. Other suitable equalizer designs are also known.

As symbol rates continue to increase, whichever equalizers are used must contend with ever-increasing levels of ISI, and must complete their processing in ever-decreasing symbol intervals. These paired needs for increased complexity and faster processing pose ever-greater challenges for communication system designers, particularly when combined with the cost and power constraints required for commercial success.

SUMMARY

Accordingly there are disclosed herein digital filters and filtering methods that may offer significant reductions in power and areal requirements with minimal performance loss. One illustrative digital filter includes: a summation circuit coupled to multiple partial product circuits. Each partial product circuit is configured to combine bits of a filter coefficient with bits of a corresponding signal sample to produce a set of partial products. The summation circuit produces a filter output using a carry-save adder ("CSA") tree that combines the partial products from the multiple partial product circuits into bits for two addends. The CSA tree has multiple lanes of adders, each lane being associated with a corresponding bit weight. The adders in one or more of the lanes associated with least significant bits of the filter output are approximate adders that trade accuracy for simpler implementation.

An illustrative receiver includes a digital filter as specified above, coupled to a decision element that derives a sequence of symbol decisions based at least in part on the filter output.

An illustrative filtering method includes, for each of multiple filter coefficients, combining bits of the filter coefficient with bits of a corresponding signal sample to produce a set of partial products. The method further includes producing a filter output using a CSA tree that combines the partial products from the multiple sets into bits for two addends, the CSA tree having multiple lanes of adders, each lane being associated with a corresponding bit weight. The adders in one or more of the lanes associated with least significant bits of the filter output are approximate adders.

Each of the foregoing equalizers and equalization methods may be implemented individually or conjointly, together with any one or more of the following features in any suitable combination: 1. the summation circuit further includes a carry-propagate adder ("CPA") that sums the two addends to form the filter output. 2. the CPA includes an adder for each overlapping bit weight of the two addends. 3. the CPA adders associated with said one or more lanes are approximate adders. 4. the summation circuit truncates a predetermined number of least significant bits from a sum of the two addends when producing the filter output. 5. the multiple partial product circuits omit any partial products associated with a bit weight below a predetermined rounding level that is greater than the bit weight associated with a product of a least significant bit of a filter coefficient with a least significant bit of a corresponding signal sample. 6. the predetermined rounding level corresponds to a number of internal rounding bits R. 7. adders in at least five lanes associated with the most significant bits of the filter output are accurate adders. 8. the signal samples are separated in space. 9. the signal samples are separated in time. 10. the filter coefficients include feed forward equalization ("FFE") filter coefficients and at least one feedback filter coefficient.

BRIEF DESCRIPTION OF THE DRAWINGS

FIG. 6A is a block diagram of an illustrative parallel DFE.

FIG. 6B is a clock signal timing diagram for the parallelized DFE.

DETAILED DESCRIPTION

Figure 1:
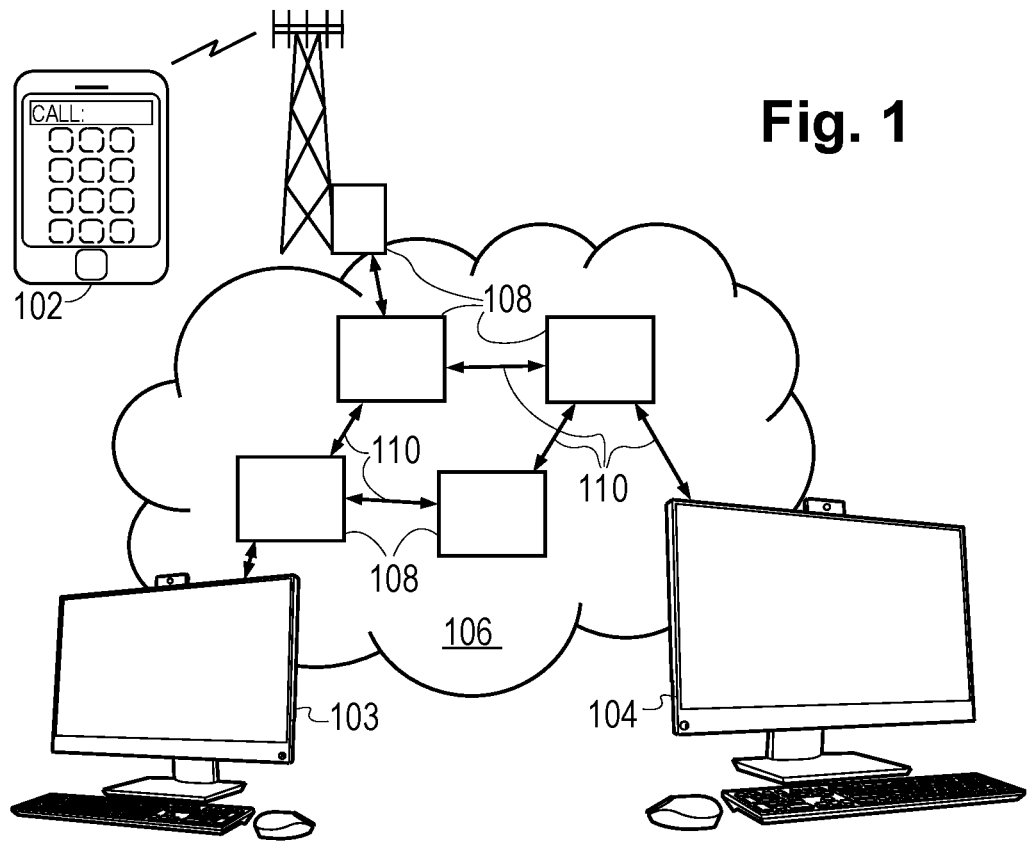
FIG. 1 shows an illustrative computer network.

Note that the specific embodiments given in the drawings and following description do not limit the disclosure. On the contrary, they provide the foundation for one of ordinary skill to discern the alternative forms, equivalents, and modifications that are contemplated by the inventors and encompassed in the claim scope.

The disclosed digital filters and filtering methods are best understood in the context of the larger environments in which they operate. Accordingly, FIG. 1 shows an illustrative communications network including a mobile device 102 and computer systems 103-104 coupled via a packet-switched routing network 106. The routing network 106 may be or include, for example, the Internet, a wide area network, or a local area network. In FIG. 1, the routing network 106 includes a network of equipment items 108, such as hubs, switches, routers, bridges, and the like. The equipment items 108 are connected to one another, and to the computer systems 103-104, via point-to-point communication links 110 that transport data between the various network components.

Figure 2:
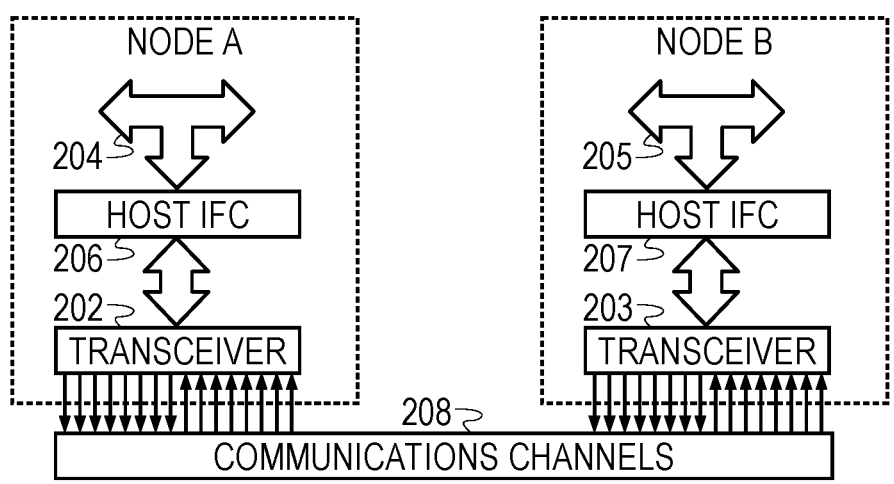
FIG. 2 is a block diagram of an illustrative point-to-point communication link.

FIG. 2 is a diagram of an illustrative point-to-point communication link that may be representative of links 110 in FIG. 1. The illustrated embodiment includes a first node ("Node A") in communication with a second node ("Node B"). Nodes A & B can each be, for example, any one of mobile devices 102, equipment items 108, computer systems 103-104, or other sending/receiving devices suitable for high-rate digital data communications.

Node A includes a transceiver 202 coupled to Node A's internal data bus 204 via a host interface 206. Similarly, Node B includes a transceiver 203 coupled to its internal bus 205 via a host interface 207. Data transfers internal to the nodes may occur via, e.g., parallel 64 or 128 bit buses. When data blocks need to be conveyed to or from a remote destination, the host interfaces 206, 207 may convert between internal data formats and network packet formats, and may provide packet sequencing and buffering for the transceivers. The transceivers 202, 203 serialize the packets for transmission via high-bandwidth communications channels 208, and process receive signals to extract the transmitted data.

The communication channels 208 extend between the transceivers 202, 203. The channels 208 may include, for example, transmission media such as fiber optic cables, twisted pair wires, coaxial cables, backplane transmission lines, and wireless communication links. (It is also possible for the channels to be formed by a magnetic or optical information storage medium, with the write-read transducers serving as transmitters and receivers.) Bidirectional communication between Node A and Node B can be provided using separate unidirectional channels, or in some circumstances, a single channel that transports signals in opposing directions without interference. The channel signal may be, for example, an electrical voltage, an electrical current, an optical power level, a polarization, an angular momentum, a wavelength, a frequency, a phase value, or any suitable attribute of energy that passes from the beginning of the channel to its terminus. The transceivers include receivers that process the received channel signals to reconstruct the transmitted data.

Figure 3:
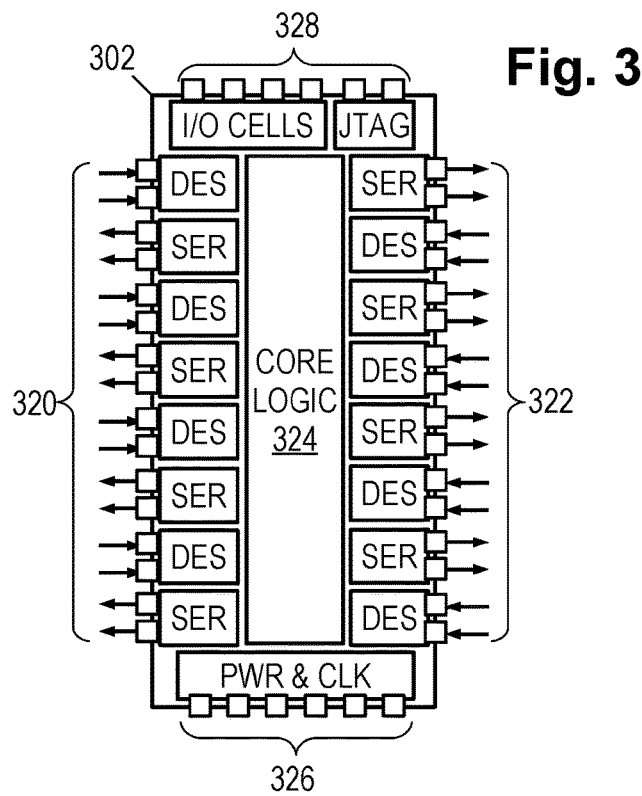
FIG. 3 is a block diagram of an illustrative serializer-deserializer transceiver.

FIG. 3 shows an illustrative monolithic transceiver chip 302. Chip 302 includes SerDes modules with contacts 320 for receiving and transmitting high-rate serial bitstreams across eight lanes of a communication channel 208, additional SerDes modules with contacts 322 for conveying the high-rate serial bitstreams to the host interface 206, and core logic 324 for implementing a channel communications protocol while buffering bitstreams between the channel and host interface. Also included are various supporting modules and contacts 326, 328, such as power regulation and distribution, clock generation, digital input/output lines for control signals, and a JTAG module for built-in self testing.

The "deserializer" implements the receiving function of the chip 302, implementing decision feedback equalization ("DFE") or any other suitable equalization technique that may employ a digital filter with adjustable tap coefficients, e.g., linear equalization, partial response equalization. At the contemplated symbol rates (above 50 Gbd), the chosen equalizer operates under severe timing constraints.

Figure 4:
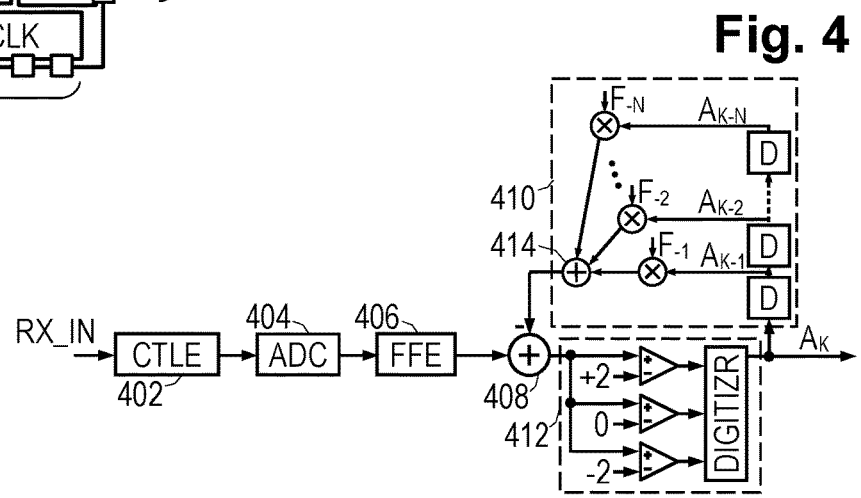
FIG. 4 is a block diagram of an illustrative decision feedback equalizer ("DFE").

FIG. 4 shows an illustrative implementation of a DFE configured for receiving PAM4 signals. An optional continuous time linear equalization ("CTLE") filter 402 provides analog filtering to bandlimit the signal spectrum while optionally boosting high-frequency components of the receive signal RX_IN. An analog-to-digital converter 404 samples and digitizes the receive signal. A feed-forward equalization ("FFE") filter 406 operates on the digitized signal to minimize leading inter-symbol interference ("ISI") while optionally reducing the length of the channel impulse response. A summer 408 subtracts a feedback signal, provided by feedback filter 410, from the filtered signal provided by the FFE filter 406 to produce an equalized signal in which the effects of trailing ISI have been minimized. A decision element 412, sometimes called a "slicer", operates on the equalized signal to determine which symbol it represents in each symbol interval. The resulting stream of symbol decisions is denoted $A_k$, where k is the time index.

In the illustrated example, the symbols are presumed to be PAM4 (−3, −1, +1, +3), so the comparators employed by decision element 412 use the decision thresholds −2, 0, and +2, respectively. (The unit for expressing symbol and threshold values is omitted for generality, but for explanatory purposes may be presumed to be volts.) The comparator outputs can be taken collectively as a thermometer-coded digital representation of the output symbol decision, or a digitizer may optionally be used to convert the comparator outputs into a binary number representation, e.g., 00 to represent −3, 01 to represent −1, 10 to represent +1, and 11 to represent +3. Alternatively, a Gray-coded representation could be employed.

The DFE generates the feedback signal with a feedback filter 410 having a series of delay elements D (e.g., latches, flip flops, or shift registers) that store the recent output symbol decisions ($A_{k-1}$, $A_{k-2}$, . . . , $A_{k-N}$, where N is the number of filter coefficients $F_{-i}$). A set of multipliers determines the product of each symbol with a corresponding filter coefficient, and a summation circuit 414 combines the products to obtain the feedback signal. Where the short symbol intervals make it infeasible to implement the feedback filter 410, the decision element 412 may be modified into a precompensation unit to "unroll" one or more taps of the feedback filter, potentially eliminating the feedback filter entirely. The precompensation unit provides speculative decisions to a multiplexing arrangement as described in, e.g., U.S. Pat. No. 8,301,036 ("High-speed adaptive decision feedback equalizer") and U.S. Pat. No. 9,071,479 ("High-speed parallel decision feedback equalizer"), which are each incorporated herein by reference in their entireties.

As an aside, we note here that practical DFE implementations typically include a timing recovery module and a filter coefficient adaptation module, but these considerations are addressed in the literature and generally known to those skilled in the art. Nevertheless we note here that at least some contemplated embodiments include one or more additional comparators to be employed for comparing the combined signal to one or more of the extreme symbol values (−3, +3), thereby providing an error signal (or error polarity signal) that can be used for timing recovery and filter adaptation.

Figure 5:
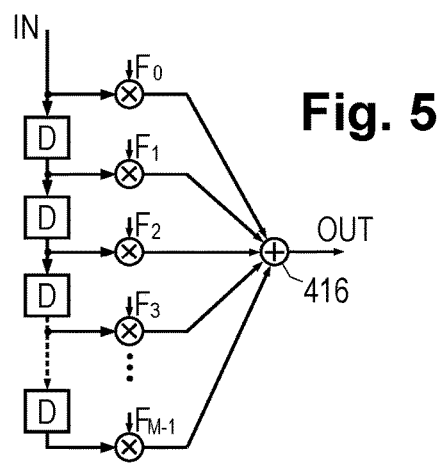
FIG. 5 is a block diagram of an illustrative digital filter.

In the illustrated implementation, FFE filter 406 is a digital filter having adjustable tap coefficients. FIG. 5 shows an illustrative finite impulse response ("FIR") implementation of a digital filter. An input signal is supplied to a sequence of delay elements. A first of the delay elements captures the input signal value once in each symbol interval while outputting the captured value from the preceding symbol interval. Each of the other delay elements captures the held value from the preceding element, repeating the operation to provide increasingly-delayed signal samples. A set of multipliers scales each of the input values in the sequence by corresponding coefficients $F_i$, supplying the scaled values in partial product form (described further below) to a summation circuit 416 that sums the scaled values to form the filter output.

The digital multipliers of FFE 406 (and the digital multipliers of feedback filter 410) may be configured to use the principle of partial products in accordance with, e.g., the Baugh Wooley algorithm as outlined in Keote and Karule, "Performance analysis of fixed width multiplier using Baugh Wooley Algorithm", IOSR J. of VLSI and Signal Proc., v8n3p31 (2018). That is, once the filter coefficient $F_m$ and signal sample $D_{k-m}$ are expressed in binary form, their product is expressible as a sum of products of their bits:

$$F_m D_{k-m} = \left(\sum_{i=0}^{7} f_{m,i} 2^i\right)\left(\sum_{j=0}^{7} d_{k-m,j} 2^j\right) = \sum_{i=0}^{7}\sum_{j=0}^{7} (f_{m,i} d_{k-m,j}) 2^{i+j}, \quad (1)$$

and the task is then to sum the bit products while taking their bit weights into account. (For simplicity, equation (1) assumes unsigned binary numbers. The adjustments for signed numbers are discussed in the open literature. See, e.g., Keote and Karule.) This approach enables the use of Carry-Save Adder ("CSA") designs that postpone full propagation of any carry bits until the last summation. When configured in this fashion, the multipliers may supply the bit products to a unitary summation circuit 416 that combines the bit products to form the filter output.

This approach can be applied to feedback filter 410, such that summation circuit 414 combines bit products supplied from the multipliers in feedback filter 410. The approach can optionally be further extended, such that summation circuits 408, 414, and 416 are all combined into a single unitary summation circuit that implements only one full propagation of carry bits, postponing it to the end of the summation where it yields the equalized signal.

The equalizer design of FIGS. 4-5 may necessitate having a relatively large number of operations performed in each symbol interval, which becomes increasingly challenging as the symbol interval grows ever smaller. FIG. 6A accordingly provides a parallelized version of the equalizer having a parallelized FFE filter, parallelized decision elements, and parallelized feedback filters to relax the timing requirements.

In FIG. 6A, CTLE filter 402 bandlimits the receive signal before supplying it in parallel to an array of analog to digital converter (ADC) elements. Each of the ADC elements is provided with a respective clock signal, each of the clock signals having a different phase, causing the elements in the array to take turns sampling and digitizing the input signal. Only one of the ADC element outputs is transitioning at any given time. See FIG. 6B for an illustration of how the clock signals are shifted in phase relative to each other. Note that the duty cycle shown is merely illustrative; the point meant to be conveyed by the diagram is the sequential nature of transitions in the different clock signals.

An array of FFE filters (FFE0 through FFE7), each form a weighted sum of the ADC element outputs. The weighted sums employ filter coefficients that are cyclically shifted relative to each other. FFE0 operates on the held signals from the 3 ADC elements operating prior to CLK0, the ADC element responding to CLK0, and the 3 ADC elements operating subsequent to CLK0, such that during the assertion of CLK4, the weighted sum produced by FFE0 corresponds to the output of FFE filter 406 (FIGS. 4 and 5). FFE1 operates on the held signals from the 3 ADC elements operating prior to CLK1, the ADC element responding to CLK1, and the 3 ADC elements operating subsequent to CLK1, such that during the assertion of CLK5, the weighted sum corresponds to that of FFE filter 406. And the operation of the remaining FFE filters in the array follow the same pattern with the relevant phase shifts. In practice, the number of filter taps may be smaller, or the number of elements in the array may be larger, so as to offer a longer window of valid output.

As with the receiver of FIG. 4, a summation circuit may combine the output of each FFE filter with a feedback signal to provide an equalized signal to a corresponding decision element. FIG. 6A shows an array of decision elements (Slicer0 through Slicer7), each operating on an equalized signal derived from a respective FFE filter output. As with the decision element 412 of FIG. 4, the illustrated decision elements employ comparators to determine which symbol the equalized signal most likely represents. The decisions are made while the respective FFE filter outputs are valid (e.g., Slicer0 operates while CLK4 is asserted, Slicer1 operates while CLK5 is asserted, etc.). The symbol decisions may be provided in parallel on an output bus to enable a lower clock rate to be used for subsequent on-chip operations.

An array of feedback filters (FBF0 through FBF7) operates on the preceding symbol decisions to provide the feedback signals for the summers. As with the FFE filters, the inputs for the feedback filters are shifted cyclically and provide a valid output only when the inputs correspond to the contents of the feedback filter 410 (FIG. 4), coinciding with the time window for the corresponding FFE filter. In practice, the number of feedback filter taps may be smaller than what is shown, or the number of array elements may be larger, so as to offer a longer window of valid output.

As with the decision element 412 of FIG. 4, the decision elements in FIG. 6B may each employ additional comparators to provide timing recovery info, coefficient training info, and/or precompensation to unroll one or more taps of the feedback filter. After accounting for the cyclic shifts, the same tap coefficients may be used for each of the FFE filters and for each of the feedback filters. Alternatively, the error module may separately calculate the residual ISI for each filter, enabling the adaptation module to adapt the tap coefficients of the separate filters independently. The summation circuits may be configured to receive and combine bit products from their associated multipliers as described previously.

Figure 7A:
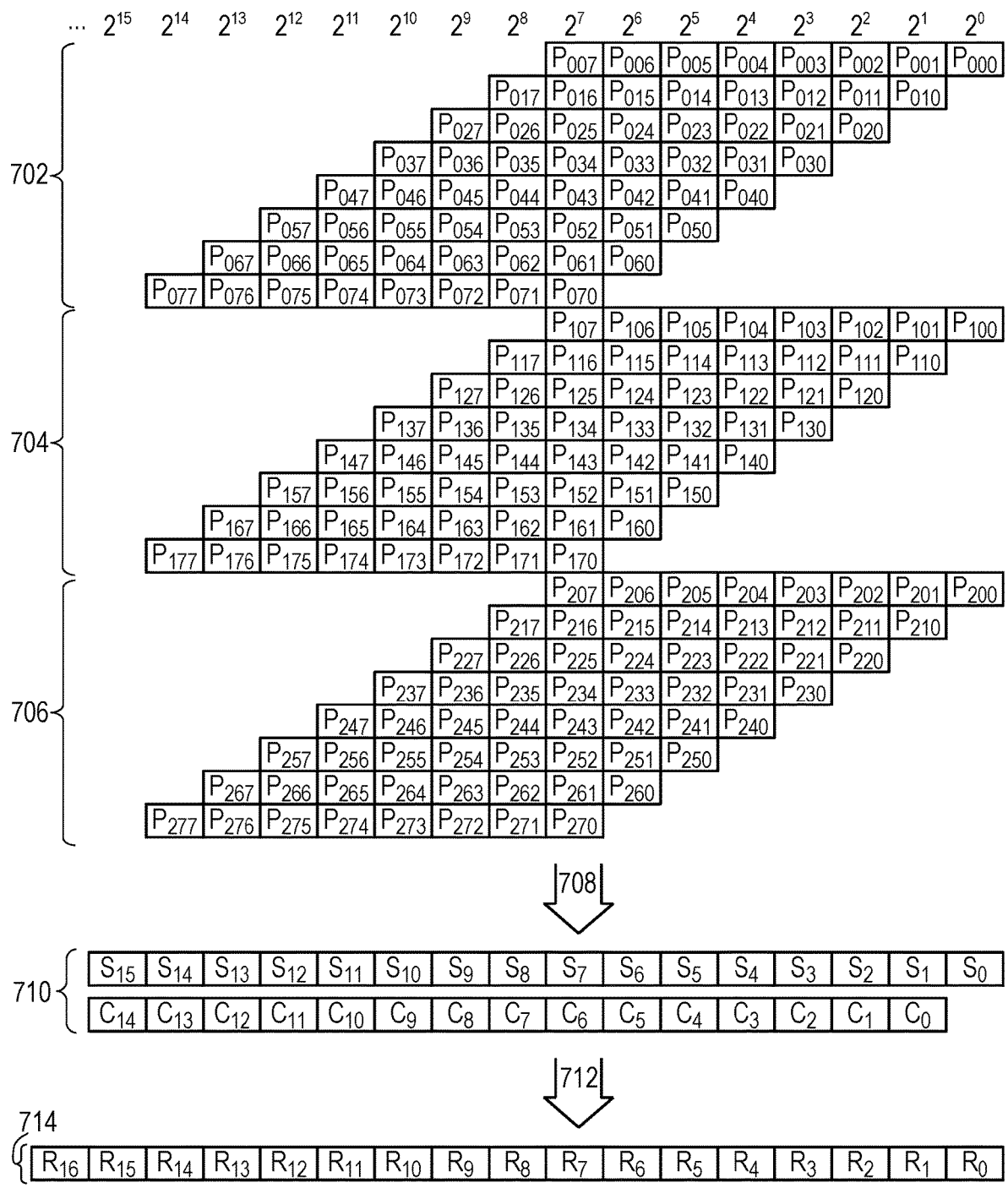
FIG. 7A relates an illustrative partial product arrangement to a filter output.

FIG. 7A is an illustrative diagram showing the bit products $P_{m,i,j}=(f_{m,i}d_{k-m,j})$ of equation (1) arranged in lanes corresponding to their associated bit weights. For illustrative purposes, this example presumes eight bit coefficients and eight bit signal sample values in a three tap FFE filter. The bit resolutions may be higher or lower, and the number of filter taps can vary but would typically be greater than three. A first partial product circuit combines the bits of filter coefficient $F_0$ with the bits of a signal sample $D_{k-0}$ to produce a first set of bit products 702. A second partial product circuit combines the bits of coefficient $F_1$ with the bits of a signal sample $D_{k-1}$ to produce a second set of bit products 704. A third partial product circuit combines the bits of coefficient $F_2$ with the bits of a signal sample $D_{k-2}$ to produce a third set of bit products 706. Additional filter coefficient multiplications would be implemented by additional partial product circuits.

Arrow 708 represents operation of a CSA tree structure reducing the bit products in each lane to bits of two addends 710. (In the figure, the notation $S_j$ represents the least significant bit of the lane j sum, and $C_j$ represents a carry bit from lane j summation.) Various reduction techniques developed for stand-alone binary multipliers (such as "carry save array" reduction, Wallace tree reduction, and Dadda tree reduction), would also be suitable for the stacked bit product sets of FIG. 7A. More detail on such techniques can be found in the literature. See, e.g., C. S. Wallace, "A suggestion for a fast multiplier", IEEE Trans. on Electronic Computers, v13n1, pp. 14-17, February 1964. L. Dadda, "Some schemes for parallel multipliers", Alta Frequenza, v34n5, pp. 349-356, May 1965.

Arrow 712 represents the operation of any suitable adder structure summing the addends 710 to obtain a binary number representation of the result 714 with bits $R_j$. Suitable options include carry propagate adder (CPA) and carry look-ahead adder structures. The result may correspond to the filter output.

Figure 7B:
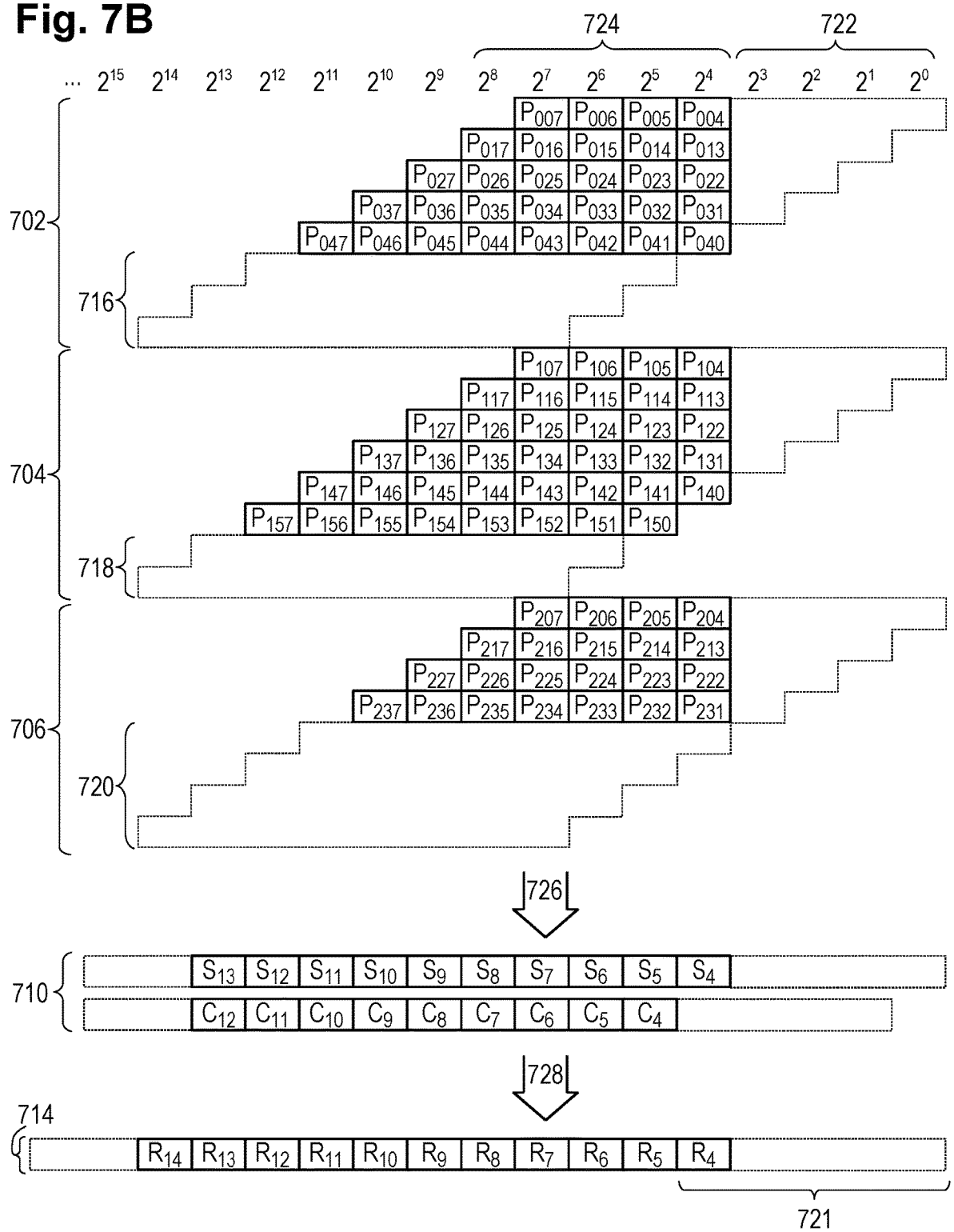
FIG. 7B shows an illustrative partial product arrangement with truncation and internal rounding.

Although applying the CSA reduction techniques to the combined set of partial products already offers significant efficiency gain, further gains can be achieved through judicious use of truncation, internal rounding, and approximation, which will be discussed in reference to FIG. 7B.

Truncation can be applied to the filter coefficients and/or the filter output. It is rarely necessary for each of the filter coefficients to be adjustable over a full eight-bit resolution; for most channels and systems, most of the filter coefficient magnitudes are much smaller than one. This observation can be used to reduce the number of bits used to represent those coefficients. Thus, in FIG. 7B, the three most significant bits of the first coefficient are truncated, eliminating the bit products in rows 716. The two most significant bits of the second coefficient are truncated, eliminating rows 718. The four most significant bits of the third coefficient are truncated, eliminating rows 720. The number of bit products to be combined can be significantly reduced in this fashion.

Bit resolution of the filter output can also be truncated. If, for example, T result bits 721 are not included in the filter output, they need not be calculated. However, it is possible that the associated carry bits might affect the result, so some caution may be exercised. In FIG. 7B, where five output bits are selected for truncation, internal rounding is used only to eliminate calculation of the four least significant bits (lanes 722).

Internal rounding omits the bit products associated with a specified number R of bit weight lanes. In theory, a fixed offset may be added to the result to minimize the rounding error, but in practice the offset may be naturally accounted for elsewhere in the receive chain (e.g., in the gain and offset adaptation for the analog to digital conversion). The number of internally rounded bits R and the number of output truncation bits T are related in that T is expected to be greater or equal to R; otherwise the (R–T) least significant bits of the output would always be zero. Conversely, if T is much greater than R, significant effort becomes invested in calculations that are increasingly unlikely to affect the outcome. Thus it is contemplated that (T–3)≤R≤T. The number of bit products to be combined can be significantly further reduced in this fashion.

To further reduce the power and areal requirements, the CSA tree structure used to combine the bit products can be modified to replace accurate adders with approximate adders as described further below. The error introduced by the approximate adders masquerades as statistical noise with a power determined by the bit weight of the lanes 724 in which the replacements are made. To limit the additional noise power to levels at or below those of other expected noise sources in the system, the approximations may be limited to a specified number of A least significant bit weight lanes 724. Where the replacements are made, a significant reduction in gate count is obtained.

Arrow 726 accordingly represents the operation of a modified CSA tree structure that employs truncation, internal rounding, and/or approximation to reduce power and areal requirements of the CSA process for summing the bit products to form bits of two addends 710. In the addend summing operation represented by arrow 728, the chosen adder structure may also replace accurate adders in lanes 724 with approximate adders to obtain further efficiencies.

Figure 7C:
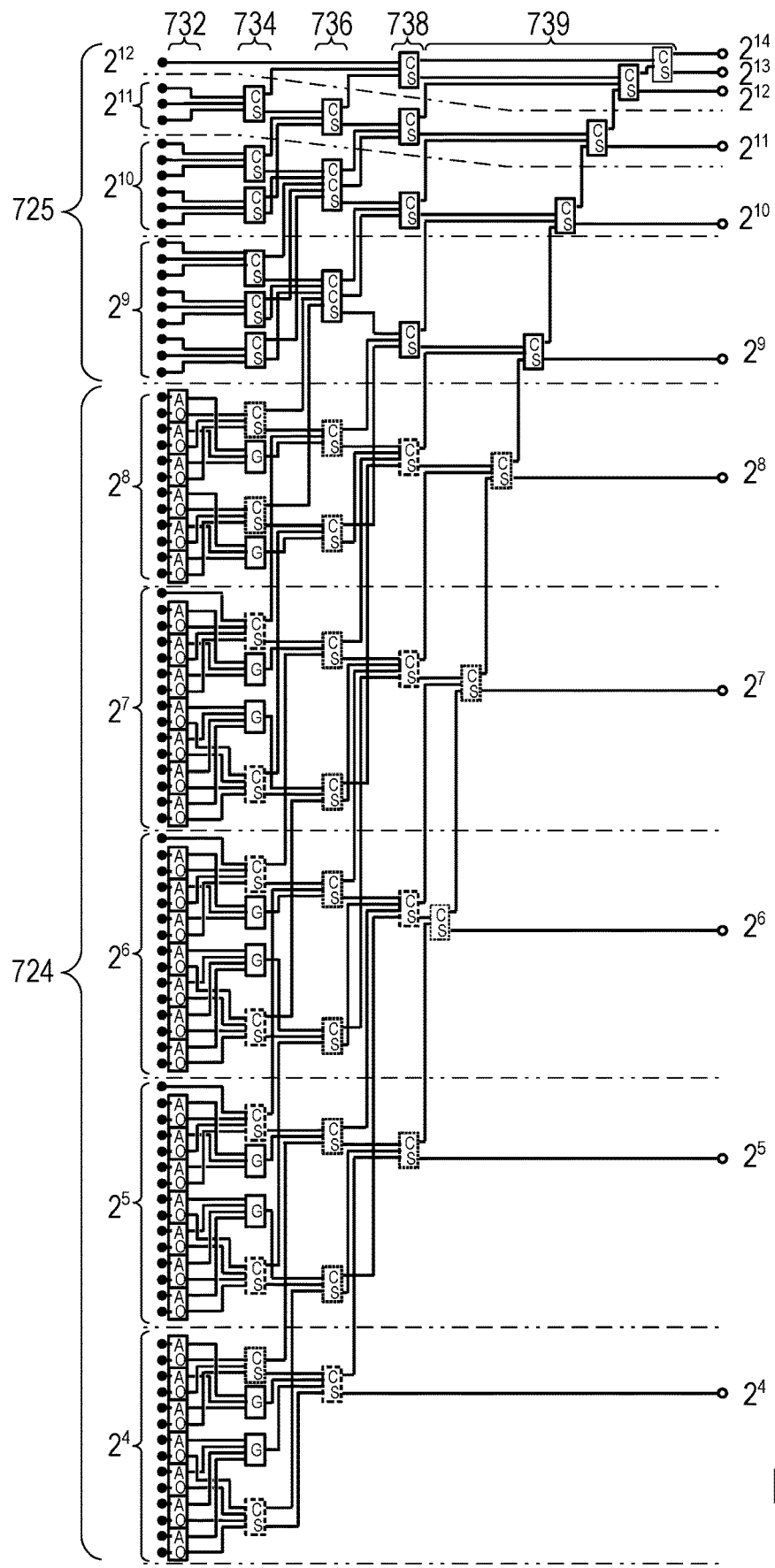
FIG. 7C shows an illustrative summation circuit using approximation.

With the foregoing context in mind, FIG. 7C shows an illustrative CSA tree structure (stages 732-738) coupled to a CPA structure (stage 739). The closed dots on the left side of FIG. 7C represent the bit products $P_{m,i,j}$ organized by bit weight. (Because the bit products within a given lane each have the same bit weight, they can be reordered as desired.)

Figure 10:
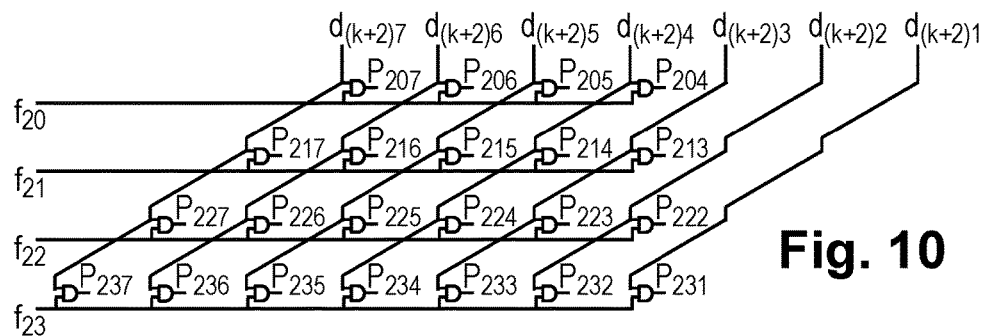
FIG. 10 is an illustrative partial product circuit.

The adder receives the bit products from multiple partial product circuits. Refer momentarily to FIG. 10, which shows a partial product circuit for producing the set of partial products 706 (FIG. 7B). Every coefficient bit is combined with every signal sample bit using a logical AND, except where the bit product would fall in a lane omitted due to internal rounding or where the coefficient bit has been truncated. The products are arranged in lanes according to bit weight and supplied to the adder structure. Other partial product circuit implementations are also known and would be suitable.

Returning to FIG. 7C, the adder structure includes a number of elements that will be described here with references to FIGS. 8A-8H. The illustrated structure was developed using the Wallace tree reduction technique, but the disclosed principles are equally applicable to other CSA array and tree structures.

Figure 8A:
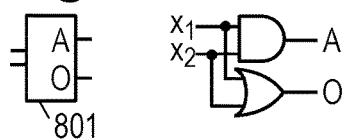
FIGS. 8A-8H show illustrative logic equivalents for summation circuit components.

In the lanes 724 where approximation is employed, the first stage 732 provides AND-OR elements 801 that combine pairs of bit products using a logical AND and a logical OR as shown in FIG. 8A. This operation alters the statistics of the bit products in a way that may be advantageous for approximation. Specifically, the bit products $P_{m,i,j}$ are expected to be "1" about 25% probability and "0" with about 75% probability. The logical AND of two bit products is then "1" with about 6% ($\frac{1}{16}$) probability and "0" with about 94% probability. The logical OR of the two bit products is "1" with about 44% (7/16) probability and "0" with about 56% probability. Notably, the number of "1"s is conserved between the input and output of the AND-OR elements.

Figure 8B:
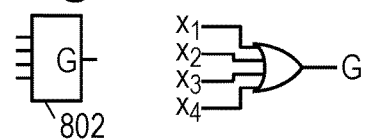

In the second stage 734, the A outputs of the AND-OR elements are combined by Group elements 802 as shown in FIG. 8B. The Group elements logically OR up to four inputs together. If each input has only a 6% probability of being asserted, the output of the Group element will correctly represent the sum of the inputs with a probability of nearly 98%.

Figure 8C:
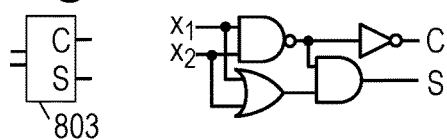

Before discussing the rest of FIG. 7C, FIGS. 8C-8H are now discussed. FIG. 8C shows an accurate half adder 803, which combines two inputs to provide a sum bit S and carry bit C in accordance with the rules of binary addition. FIG. 8C shows an equivalent logic circuit for the half adder, but other implementations would also be suitable.

Figure 8F:
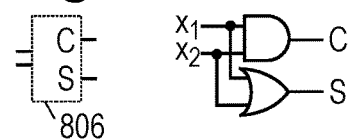
Figure 8D:
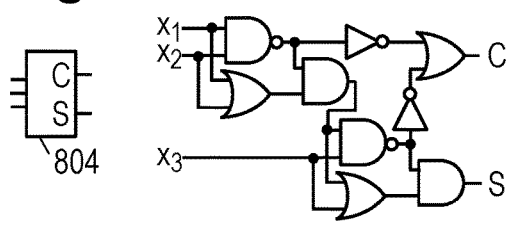

FIG. 8D shows an accurate full adder 804, which combines three inputs to provide a sum bit S and a carry bit C in accordance with the rules of binary addition. FIG. 8D also shows an equivalent logic circuit for the accurate full adder, but other implementations would also be suitable.

Figure 8G:
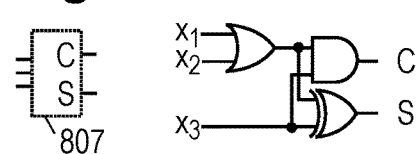
Figure 8H:
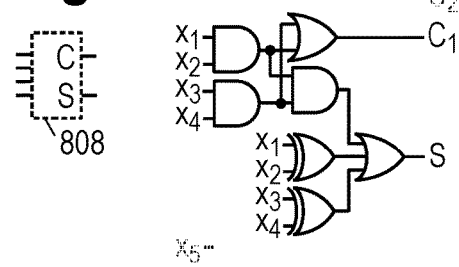
Figure 8E:
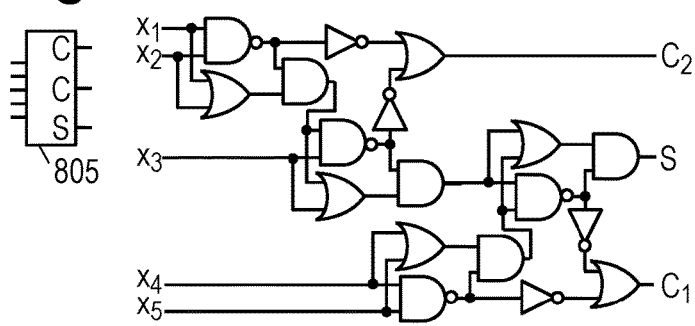

FIG. 8E shows an accurate compressor 805, which combines five inputs to provide a sum bit S and two carry bits $C_1$, $C_2$. Aside from a different propagation delay, the carry bits are interchangeable and each associated with a bit weight twice that of the sum bit S. FIG. 8E shows an equivalent logic circuit for the compressor, but other implementations would also be suitable.

FIG. 8F shows an approximate half-adder 806, which combines two inputs to produce a sum bit S and a carry bit C. Assuming independent inputs asserted with 50% probability, the output is accurate with 75% probability and has an error of magnitude 1 with 25% probability. The approximate half-adder 806 has a reduced gate count relative to accurate half adder 803 (FIG. 8C).

FIG. 8G shows an approximate full adder 807, which combines three inputs to produce a sum bit S and a carry bit C. Assuming independent inputs asserted with 50% probability, the output is accurate with 75% probability and has an error of magnitude 1 with 25% probability. The approximate full-adder 807 has a reduced gate count relative to accurate full adder 804 (FIG. 8D).

FIG. 8H shows an approximate compressor 808, which combines four inputs to produce a sum bit S and a carry bit C. Approximate compressor 808 is conceptually a replacement for accurate compressor 805, but it ignores one of the inputs and does not compute a second carry bit. Assuming four independent inputs asserted with 50% probability (and assuming that the second carry bit is held at zero), the output is accurate with probability 69% and has an error of magnitude 1 with 31% probability.

In the second stage 734, the O outputs of the AND-OR elements are combined within each lane three or four at a time by approximate full adders 807 or approximate compressors 808, each of which produces a sum bit S and a carry bit C. In the non-approximation lanes 725, stage 734 employs accurate full adders 804 to sum bit products within each lane three at a time, producing corresponding sum and carry bits. The carry bits have higher associated bit weights and are accordingly routed to the next lane in preparation for the third stage. The second stage 734 reduces the number of bits from 90 to 43.

In the third stage 736, the bits in each approximation lane 724 are combined three or four at a time by approximate full adders 807 or approximate compressors 808, each of which produces a sum bit S and a carry bit C. In each of the non-approximation lanes 725, stage 736 combines bits three or five at a time using accurate full adders 804 or accurate compressors 805. The full adders each produce a sum bit and a carry bit. The compressors each produce a sum bit and two carry bits $C_1$, $C_2$. The carry bits have higher associated bit weights and are accordingly routed to the next lane in preparation for the fourth stage. The third stage 736 reduces the number of bits from 43 to 28.

In the fourth stage 738, the bits in each approximation lane 724 are combined three or four at a time by approximate full adders 807 or approximate compressors 808, each of which produces a sum bit S and a carry bit C. In each of the non-approximation lanes 725, stage 738 combines bits three at a time using accurate full adders 804, which each produce a sum bit and a carry bit. The carry bits have higher associated bit weights and are accordingly routed to the next lane in preparation for the CPA stage 739. The fourth stage 738 reduces the number of bits from 28 to 17. The lanes associated with bit weights $2^4$ and $2^5$ each have a single sum bit S, and the fourth stage produces a single carry bit with bit weight $2^{13}$. For each of the bit weights between $2^5$ and $2^{13}$, the fourth stage produces a single sum bit S and a single carry bit C in each lane. The outputs of the fourth stage can accordingly form the bits of two addends.

Stage 739 is shown with a CPA configuration, and it operates to sum the addend bits. No further action is needed in the lanes corresponding to bit weights $2^4$ and $2^5$, so these bits are passed without modification. In the lane associated with bit weight $2^6$, an approximate half adder 806 sums the carry bit from the preceding lane with the sum bit, producing an output bit with weight $2^6$ and a carry bit for the next lane. In the lane associated with bit weight $2^7$, an approximate full adder 807 sums the carry bit from the preceding lane of the CPA stage with the sum bit and carry bits from the fourth stage, producing an output bit with weight $2^7$ and a carry bit for the next lane. In the lane associated with bit weight $2^8$, an approximate full adder 807 sums the carry bit from the preceding lane of the CPA stage with the sum bit and carry bits from the fourth stage, producing an output bit with weight $2^8$ and a carry bit for the next lane.

In the lanes associated with bit weights $2^9$ through $2^{12}$, accurate full adders 804 sum the carry bit from the preceding lane of the CPA stage with the sum bit and carry bits from the fourth stage, producing an output bit for the lane and a carry bit for the next lane. For bit weight $2^{13}$, an accurate half adder 803 sums the carry bit from the preceding lane of the CPA stage with a carry bit from the fourth stage, producing a sum bit having weight $2^{13}$, and a carry bit having weight $2^{14}$.

Though FIG. 7C is described assuming unsigned binary numbers, the disclosed principles are readily applicable to multiplication of signed (two's-complement) binary numbers using the Baugh-Wooley technique as set forth in R. Baugh and B. A. Wooley, "A two's complement parallel array multiplication algorithm," IEEE Trans. Comput., vol. 22, pp. 1045-1047, December 1973, or as improved in the subsequent literature. This approach complements the partial products including a sign bit and adds a fixed offset for each filter coefficient-signal sample product. The fixed offsets can of course be combined to form a single offset in one additional row of the partial product arrangements of FIGS. 7A-7B and accounted for in the CSA adder structure design process.

Figure 9:
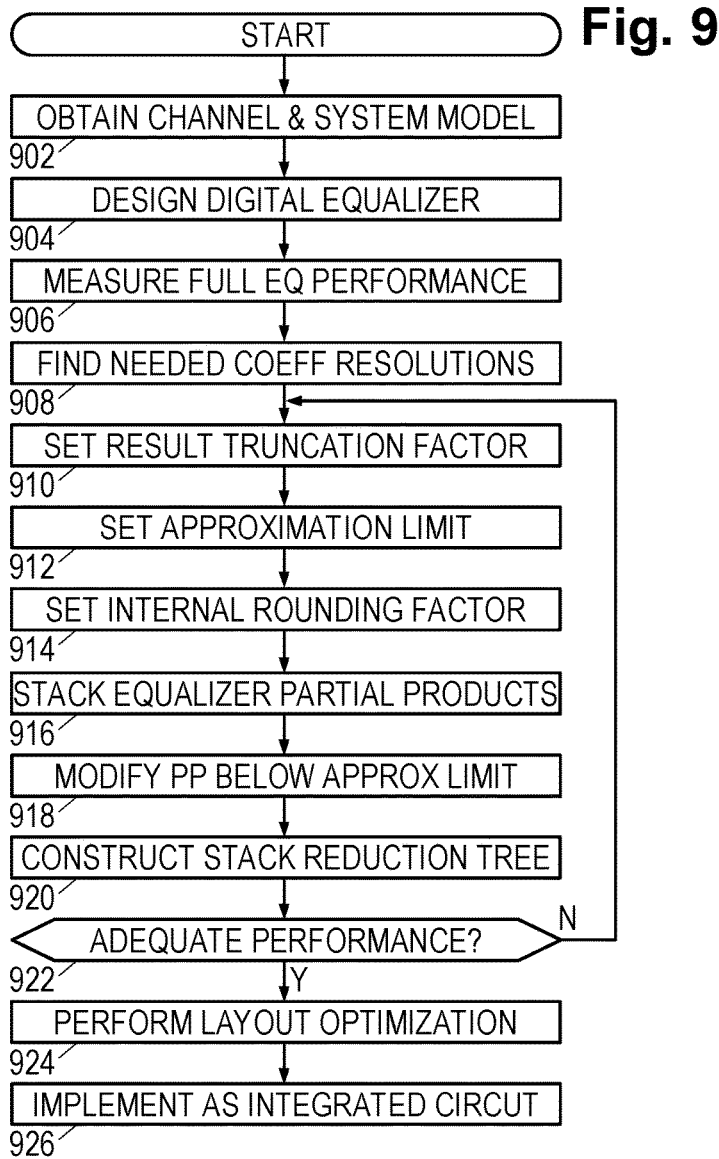
FIG. 9 is a flow diagram of an illustrative digital filter design method.

FIG. 9 is a flow diagram of a method for designing an equalizer that uses truncation, internal rounding, and/or approximation to reduce filter complexity, power, and area. In block 902, the designer obtains a model of the communications channel and system, which includes the transmitter and receiver, and may include expected characteristics of noise, jitter, and other sources of performance degradation. In block 904, the designer develops a design for receiver-side equalization including at least one digital filter, and may further develop a digital filter for transmit-side equalization ("pre-equalization"). The equalizer design(s) may include equalizer type (e.g., linear equalizer, decision feedback equalizer), the number of taps for each filter, coefficient adaptation module, and timing recovery module.

In block 906, the designer determines, typically via simulation, the performance of the system without truncation, internal rounding, approximation, or other constraints on the filter coefficients or filter implementation. The performance may be evaluated over a range of expected channel variations to determine the useful range of values for each filter coefficient. If the system performance is inadequate, the designer will revise the system design by, e.g., increasing the number of filter coefficients, increasing the bit resolution of signal samples, adjusting the size of the signal constellation, and/or reducing symbol rate until satisfactory performance is achieved.

In block 908, the designer uses the useful range of values identified for each coefficient to set the number of bits needed for each coefficient. When combined with the chosen bit resolution for the signal samples, the coefficient resolutions will determine the possible range of filter outputs, which is useful for determining the number of desired bits in the filter output. With this information, the designer may select a number of bits to be truncated from the filter output in block 910. If, for example, the filter output nominally includes 15 bits of resolution the designer may recognize that adaptation and timing recovery modules need no more than 10 or 11 bits to perform adequately, and may thus decide to truncate, e.g., the five least significant bits from the filter output.

In block 912, the designer may set a number of the filter output bits that can safely be derived using approximate adders and hence the number of bits for which accurate adders should be used. The designer may initially choose to employ approximation for about half of the filter output bits, e.g., the five least significant bits. (In the example of FIGS. 7B, 7C, approximate adders are used for the four least significant output bits and one of the truncated bits.)

In block 914, the designer may set a number of bits for internal rounding. As previously discussed, the number of internally rounded bits R and the number of output truncation bits T are related in that T is expected to be greater or equal to R; otherwise the (R−T) least significant bits of the output would always be zero. Conversely, if T is much greater than R, significant effort is expended on calculations that are increasingly unlikely to affect the outcome. Thus it is contemplated that $(T-3) \leq R \leq T$, though of course there may be situations where it is desirable to select an R outside this range. In the example of FIGS. 7B, 7C, R is chosen to be one less than the number of truncation bits, i.e., four.

In block 916, the designer provides partial product circuits to generate the appropriate bit products, arranged (or "stacked") by associated bit weight. In block 918, the designer provides a layer of AND-OR elements to provide pair-wise combinations of the bit products in the lanes where approximate adders are to be used.

In block 920, the designer constructs the stack reduction tree using the array structure, Wallace tree structure, Dadda tree structure, or any suitable variant. (The Dadda approach typically yields an adder structure with the fewest number of gates.) The stack reduction circuit may employ approximate adders in those lanes below the selected limit for using approximate adders. Typically, the number of gates in these lanes can be reduced by nearly half using such approximate adders. The final stage of the reduction structure sums the addend bits from the previous stage using a CPA or other suitable structure, which may also include approximate adders in the lanes where approximation is desired.

In block 922, the designer evaluates the system performance over a range of expected channel variations, verifying that the use of truncation, internal rounding, and/or approximation has provided the desired efficiency gains without degrading performance below the specification. It is expected that the other sources of noise and performance degradation will typically mask any degradation caused by the more efficient filter designs, but if this is not the case, the designer can repeat blocks 910-922 as needed to adjust the design factors and determine the most efficient filter design that satisfies performance requirements.

Once the desired design has been found, layout software may be used in block 924 to design and optimize the process masks for manufacturing the integrated circuits including the filters. In block 926, the process masks are used to manufacture the integrated circuits, which are then packaged and integrated into cables, interfaces, or products for retail.

Though the foregoing discussion has focused on equalizers for sampled signal sequences, the disclosed principles are also applicable to filters for spatially sampled signals for beam formers, interferometers, and other multiple input multiple output (MIMO) systems. Image and video filters, neural networks, and indeed any system, device, or method that employs application specific integrated circuitry for matrix or vector multiplication, convolution, or weighted summation, can use the truncation, internal rounding, and/or approximation in structures for more efficiently deriving addends and a final summation from multiple sets of bit products stacked by bit weight.

Numerous alternative forms, equivalents, and modifications will become apparent to those skilled in the art once the above disclosure is fully appreciated. It is intended that the claims be interpreted to embrace all such alternative forms, equivalents, and modifications where applicable.

What is claimed is:

1. A receiver that comprises:
    a digital filter including:
        multiple partial product circuits, each partial product circuit configured to combine bits of a filter coefficient with bits of a corresponding signal sample to produce a set of partial products; and
        a summation circuit coupled to the multiple partial product circuits to produce a filter output using a carry-save adder ("CSA") tree that combines the partial products from the multiple partial product circuits into bits for two addends, the CSA tree having multiple lanes of adders, each lane being associated with a corresponding bit weight, the adders in one or more of the lanes associated with least significant bits of the filter output being approximate adders; and
    a decision element that derives a sequence of symbol decisions based at least in part on the filter output.

2. The receiver of claim 1, wherein the filter coefficients include feed forward equalization ("FFE") filter coefficients and at least one feedback filter coefficient.

3. The receiver of claim 1, wherein the decision element comprises a slicer for four-level pulse amplitude modulation (PAM4).

4. The receiver of claim 1, wherein the decision element includes a multiplexing arrangement coupled to a precompensation unit.

5. The receiver of claim 1, wherein the summation circuit further includes a carry-propagate adder ("CPA") that sums the two addends to form the filter output, the CPA having an adder for each overlapping bit weight of the two addends, wherein the CPA adders associated with said one or more lanes associated with least significant bits are approximate adders.

6. The receiver of claim 1, wherein the multiple partial product circuits omit any partial products associated with a bit weight below a predetermined rounding level, the predetermined rounding level being greater than the bit weight associated with a partial product of a least significant bit of a filter coefficient with a least significant bit of a corresponding signal sample.

7. The receiver of claim 6, wherein the predetermined rounding level corresponds to a number of internal rounding bits R, and wherein the summation circuit truncates at least one least significant bit from a sum of the two addends when producing the filter output.

8. The receiver of claim 1, wherein the adders in at least five lanes associated with the most significant bits of the filter output are accurate adders.

9. The receiver of claim 1, wherein the signal samples are separated in space.

10. The receiver of claim 1, wherein the signal samples are separated in time.

11. A receiving method that comprises:
for each of multiple filter coefficients, combining bits of the filter coefficient with bits of a corresponding signal sample using multiple partial product circuits to produce a set of partial products;
producing a filter output using a carry-save adder ("CSA") tree that combines the partial products from the multiple sets into bits for two addends, the CSA tree having multiple lanes of adders, each lane being associated with a corresponding bit weight, the adders in one or more of the lanes associated with least significant bits of the filter output being approximate adders; and
using a decision element to derive a sequence of symbol decisions based at least in part on the filter output.

12. The receiving method of claim 11, wherein the bit weights associated with said one or more of the lanes limit statistical noise of the approximate adders to a power level at or below a noise power level in the signal samples.

13. The receiving method of claim 11, wherein said using a decision element to derive includes comparing the filter output to one or more decision thresholds.

14. The receiving method of claim 13, wherein said one or more decision thresholds include precompensation.

15. The receiving method of claim 11, wherein said using a decision element to derive includes combining the filter output with a feedback signal and comparing the combined signal to one or more decision thresholds.

16. The receiving method of claim 11, wherein said producing further employs a carry-propagate adder ("CPA") that sums the two addends to form the filter output, the CPA having an adder for each overlapping bit weight of the two addends, wherein the CPA adders associated with said one or more lanes are approximate adders.

17. The receiving method of claim 11, wherein each set of partial products omits any partial products associated with a bit weight below a predetermined rounding level, the predetermined rounding level being greater than the bit weight associated with a partial product of a least significant bit of a filter coefficient with a least significant bit of a corresponding signal sample.

18. The receiving method of claim 17, wherein the predetermined rounding level corresponds to a number of internal rounding bits R, and wherein said producing includes truncating at least one least significant bit from a sum of the two addends.

19. The receiving method of claim 11, wherein the adders in at least five lanes associated with most significant bits of the filter output are accurate adders.

* * * * *